United States Patent [19]

Goto et al.

[11] Patent Number: 4,650,742

[45] Date of Patent: Mar. 17, 1987

[54] RECORDING MEDIA WITH RECORDING LAYER OF TWO METAL LAYERS SANDWICHING SUBLIMABLE ORGANIC SUBSTANCE LAYER

[75] Inventors: Yasuyuki Goto, Kawasaki; Nagaaki Koshino; Seiya Ogawa, both of Yokohama; Hironori Goto, Atsugi; Koichi Ogawa, Yokohama, all of Japan

[73] Assignee: Fujitsu Limited, Kawasaki, Japan

[21] Appl. No.: 839,827

[22] Filed: Mar. 13, 1986

Related U.S. Application Data

[63] Continuation of Ser. No. 684,153, Dec. 20, 1984, abandoned, which is a continuation of Ser. No. 449,578, Dec. 14, 1982, abandoned.

[30] Foreign Application Priority Data

Dec. 22, 1981 [JP] Japan ................... 56-207862

[51] Int. Cl.⁴ .............. G03C 1/00; G01D 15/14; G01D 15/34
[52] U.S. Cl. ............. 430/271; 346/76 L; 346/135.1; 430/270; 430/273; 430/275; 430/321; 430/346; 430/348; 430/495; 430/945
[58] Field of Search ............ 430/945, 321, 346, 348, 430/495, 270, 271, 273, 275; 346/76 L, 135.1

[56] References Cited

U.S. PATENT DOCUMENTS

| | | | |
|---|---|---|---|
| 4,000,492 | 12/1976 | Willens | 346/76 L |
| 4,195,312 | 3/1980 | Bell et al. | 346/76 L |
| 4,214,249 | 7/1980 | Kasai et al. | 430/945 |
| 4,230,939 | 10/1980 | de Bont et al. | 346/76 L |
| 4,241,355 | 12/1980 | Bloom et al. | 346/76 L |
| 4,290,075 | 9/1981 | Jacobs et al. | 430/321 |
| 4,300,143 | 11/1981 | Bell et al. | 430/945 |
| 4,357,616 | 11/1982 | Terao et al. | 430/945 |
| 4,364,986 | 12/1982 | Zwanenburs et al. | 430/945 |

OTHER PUBLICATIONS

Bell et al., IEEE Journal of Quantum Electronics, vol. QE-14, No. 7, 7/1978.

Primary Examiner—Charles L. Bowers, Jr.
Attorney, Agent, or Firm—Staas & Halsey

[57] ABSTRACT

A recording medium suitable for writing and reading out information by irradiating a photobeam onto a recording layer at a relatively low power, includes a light transmissible substrate, a light transmissible subbing layer, and a recording layer. The recording layer includes a radiation transmissible substrate, a radiation transmissible subbing layer composed of an inorganic material laminated on the substrate, and a recording layer composed of a sublimable organic substance layer laminated on the subbing layer and a metal layer laminated on the organic layer. Alternatively, the recording layer can include a radiation transmissible substrate, a radiation transmissible subbing layer composed of an inorganic material laminated on the substrate, and a recording layer the composed of a first metal layer laminated on the subbing layer, a sublimable organic substance layer laminated on the first metal layer, and a second metal layer laminated on the sublimable organic substance layer the recording medium has a high photosensitivity and can record information at a high quality (i.e., a high signal-to-noise ratio).

5 Claims, 5 Drawing Figures

PRIOR ART

RECORDING MEDIA WITH RECORDING LAYER OF TWO METAL LAYERS SANDWICHING SUBLIMABLE ORGANIC SUBSTANCE LAYER

This is a continuation of co-pending application Ser. No. 684,153 filed on Dec. 20, 1984, now abandoned which is a continuation of U.S. application Ser. No. 449,578, filed Dec. 14, 1982, now abandoned.

BACKGROUND OF THE INVENTION

1. Field of the Invention

The present invention relates to a recording medium. More specifically, it relates to a recording medium suitable for use in an optical disc having a high photosensitivity and a high signal-to-noise (S/N) ratio.

2. Description of the Prior Art

Recent rapid progress in optical techniques have led to the development and use of optical discs capable of recording information at a high recording density. In the art, information is recorded in a recording layer formed on the surface of a substrate by using laser beams or other photobeams to open information holes (i.e., pits) in the layer. The recorded information is read out (or detected), based on the presence or absence of pits in the recording layer, by irradiating a photobeam onto the recording layer.

Known recording media for use in optical discs (referred to hereinafter as "the recording medium or media") comprises a thin film of a simple substance such as bismuth (Bi) or tellurium (Te) formed as a recording layer on the surface of a substrate by, for example, a standard vapor deposition technique. Conventional recording media, however, have several disadvantages. First, existing semiconductor lasers, which have relatively small power, cannot easily be used for the recording of information from the viewpoint of photosensitivity. Second, the media's signal-to-noise (S/N) ratio is low, making information difficult to reproduce at a high quality. For instance, when information is recorded at an optical disc speed of 1800 rpm in a recording layer composed of Te formed on a poly(methyl methacrylate) substrate using a laser beam having a power of 17 to 18 mW at the surface of the optical disc, the S/N ratio of the reproducing signal at a band width of 10 MHz is at most 38 dB.

SUMMARY OF THE INVENTION

Accordingly, the objects of the present invention are to eliminate the above-mentioned disadvantages of the prior art and to provide a recording medium capable of recording information having a high quality (i.e., a high S/N ratio) and a high photosensitivity (i.e., by using a photobeam having a relatively low power).

Other objects and advantages of the present invention will be apparent from the following description.

In accordance with the present invention, there is provided a recording medium suitable for writing and reading information by irradiating a photobeam onto a recording layer, comprising a radiation transmissible substrate; at least one radiation transmissible subbing layer composed of an inorganic material laminated on the substrate; and a recording layer comprising at least one sublimable organic substance layer laminated on the subbing layer and at least one metal layer laminated on the organic layer.

In accordance with the present invention, there is also provided a recording medium suitable for writing and reading out information by irradiating a photobeam onto a recording layer, comprising: a radiation transmissible substrate; at least one radiation transmissible subbing layer composed of an inorganic material laminated on the substrate; and a recording layer comprising at least one first metal layer laminated on the subbing layer, at least one sublimable organic substance layer laminated on the first metal layer and at least one second metal layer laminated on the sublimable organic substance layer.

The present invention will be better understood from the description set forth below with reference to the accompanying drawings.

BRIEF DESCRIPTION OF THE DRAWINGS

FIGS. 4(a) and (b) are schematic drawings of the pit when information is recorded in a conventional recording layer comprising a poly(methyl methacrylate) substrate and a Te layer; and FIGS. 5(a) and (b) are schematic drawings of the pit when information is recorded in the present recording layer comprising a poly(methyl methacrylate) substrate, a silicon oxide (SiO) subbing layer, a first Te layer, a copper phthalocyanine layer, and a second Te layer.

DESCRIPTION OF THE PREFERRED EMBODIMENTS

Figure 1:
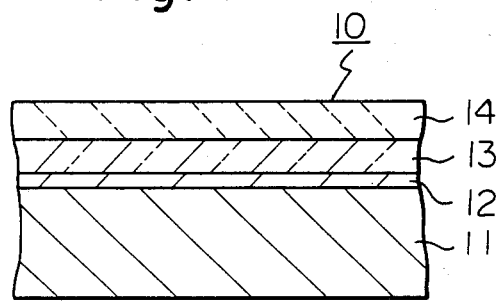
FIG. 1 is a schematic sectional view of the first preferred embodiment of the recording medium according to the present invention.

As illustrated in FIG. 1, the recording medium 10, according to the first embodiment of the present invention, comprises a radiation (or light) transmissible substrate 11, a radiation (or light) transmissible subbing layer 12, a sublimable organic substance layer 13, and a metal layer 14.

Figure 2:
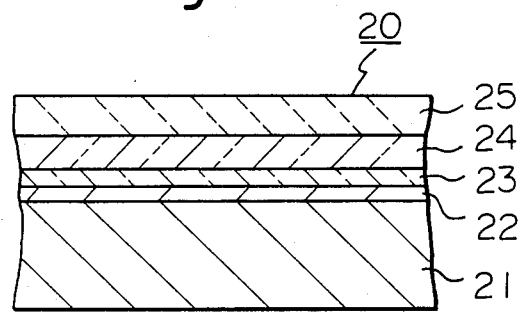
FIG. 2 is a schematic sectional view of the second preferred embodiment of the recording medium according to the present invention.

As illustrated in FIG. 2, the recording medium 20, according to the second embodiment of the present invention, comprises a radiation transmissible substrate 21, a radiation transmissible subbing layer 22, a first metal layer 23, a sublimiable organic substance layer 24, and a second metal layer 25.

Figure 3:
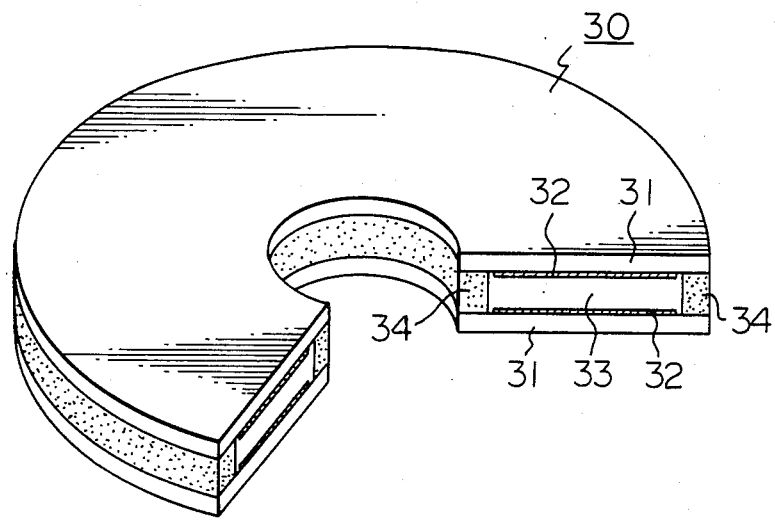
FIG. 3 is a partially cut-away schematic perspective view of an optical disc including the recording medium of the present invention.
Figure 3:
Figure 3:
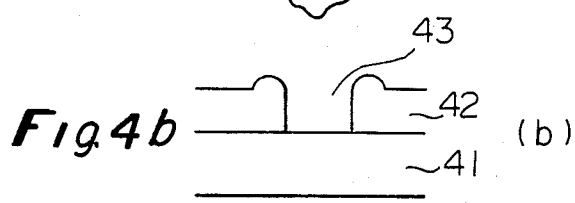
Figure 3:
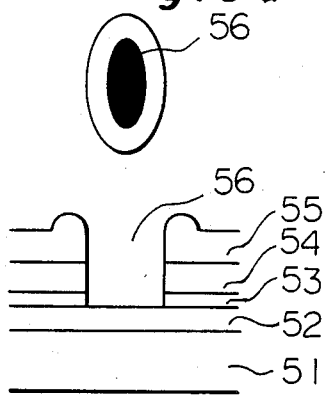

The recording medium can be assembled as a so-called air sandwich type optical disc 30 as shown in FIG. 3. The optical disc 30 comprises radiation transmissible substrates 31, recording layers 32, and spacers 34 (subbing layers are not shown in FIG. 3). Reference numeral 33 represents an air layer enclosed within the substrates 31 and spacers 34.

The radiation transmissible (or transparent) substrates 11 and 21 of FIGS. 1 and 2, respectively can be formed by any radiation transmissible synthetic resin, such as poly(methyl methacrylate), polycarbonate, poly(vinyl chloride), and polystyrene which have a low thermal conductivity and, therefore, results in a higher sensitivity in the resultant recording medium.

The radiation transmissible (or transparent) subbing layers 12 and 22 of FIGS. 1 and 2, respectively, comprises any radiation transmissible inorganic materials having a melting point higher than that of the metal of the metal layers 14, 23, and 25. Typical examples of inorganic materials are SiO, $SiO_2$, $MgF_2$ and $Al_2O_3$ or any mixture thereof. The radiation transmissible subbing layers 12 and 22 can readily be formed on the surface of the substrates 11 and 21 by any known vapor deposition technique. Although there is no limitation on the thickness of the subbing layers 12 and 22, the thickness is generally 3 nm or more, desirably 5 to 15 nm. The use of the subbing layers 12 and 22 in the recording media 10 and 20 results in a high sensitivity in the reproduction signal. The use of the subbing layers 12 and 22 having too large a thickness reduces the sensitivity. For instance, the sensitivity of a subbing layer having a thickness of 100 nm decreases by about 20% as compared with a subbing layer having a thickness of 10 nm. It is believed that this decrease in sensitivity is caused by the rapid release of heat supplied by a photobeam through the subbing layer 12 and 22 which have a thermal conductivity higher than that of the substrate material.

The sublimable organic substance layers 13 and 24 can be composed of any sublimable organic substances having a sublimation point not far from the melting point of the metal forming the metal layers 14, 23 and 25, of FIGS. 1 and 2 respectively, desirably within the range of about ±20% from the melting point of the metal. Typical examples of such organic substances are copper pthalocyanine having a sublimation point of 420° C. to 430° C., fluorescein having a sublimation point of 314° C. to 316° C., and lead phthalocyanine having a sublimation point of 450° C. to 500° C. The sublimable organic substance layers 13 and 24 can be readily formed on the subbing layer 12 and the metal layer 22, respectively, by any known vapor deposition technique. Although there is no limitation on the thickness of the organic substance layers 13 and 24, the thickness is generally 5 nm or more, desirably 10 to 100 nm. The use of the organic layers 13 and 24 assists the smooth melting and hole-opening of the metal layers 14 and 25 when information is written into the recording layer by irradiating a photobeam onto the recording layer. Use of the organic layers 13 and 24 having too large a thickness tends to result in a decrease in the sensitivity and the S/N ratio of the recording layer.

The metal layers 14, 23, and 25 can be composed of any metals having a relatively low melting point (e.g., about 1000° C. or less) and a relatively low thermal conductivity (e.g., 0.1 cal/sec.cm.deg or less). Typical examples of such metals are Te (m.p. 450° C.), Bi (m.p. 271° C.), In (m.p. 157° C.), Se (m.p. 221° C.), As (m.p. 612° C.), Pb (m.p. 327° C.), and Sn (m.p. 232° C.). Any alloys obtained therefrom and any mixture thereof can also be used. The metal layers 14, 25 and 23 can be readily formed on the organic substance layers 13 and 24 and the subbing layer 22, respectively, by any known vapor deposition technique. Although there is no limitation on the thickness of the metal layers 14, 23, and 25, the thickness is generally 5 nm or more, desirably 10 to 100 nm. Use of the metal layers 14 and 25 having too large a thickness necessitates a large amount of light energy for melting the metal to open pits. Use of the metal layer 23 further improves the photosensitivity of the recording medium when information is recorded in the recording medium and also results in a better S/N ratio when the recorded information is reproduced.

According to the present invention, a recording medium having a high photosensitivity when information is recorded and having a high S/N ratio when the information is reproduced can be provided. It is believed that the high photosensitivity of the recording medium according to the present invention can be obtained because the high evaporation ability of the sublimable organic substance in the organic substance layers 13 and 24 assists or accelerates the melting and removal of the metal at the desired portions in the metal layers 14 and 25 due to the heat derived from the irradiation of the photobeam recording information at the desired portions in the metal layers 14 and 25 is also assisted by the low thermal conductivity of the organic substance because the heat derived from the irradiation of the photobeam is not released through the organic substance layers 13 and 24. Furthermore, the photosensitivity of the recording medium is further improved when the recording layer has a laminated structure such that the organic substance layer 24 is sandwiched between two metal layers 23 and 25, as in FIG. 2. The presence of the additional metal layer 23 enables the high evaporation and sublimation abilities of the organic substance to be completely exhibited.

It is also believed that the high quality (or S/N ratio) of the reproduction signal of the recording medium according to the present invention can be obtained because smooth information holes (or pits) can be formed due to the presence of the inorganic material subbing layer 12 or the presence of the inorganic material subbing layer 22 and the metal layer 23. For instance, as schematically illustrated in FIGS. 4(a) and (b), when information is written into a recording medium comprising a poly(methyl methacrylate) substrate 41 and a Te layer 42 by the irradiation of a photobeam, an information hole (i.e., a pit) 43 having an irregular profile is opened. However, as schematically illustrated in FIGS. 5(a) and (b), when information is written into the present recording medium comprising a poly(methyl methacrylate) substrate 51, a SiO subbing layer 52, a Te layer 53, a copper phthalocyanine layer 54, and a Te layer 55, an information hole (i.e., a pit) 56 having a smooth and regular profile is opened. These profiles were determined by micrographs. It is believed that the smooth profile of a pit 56 can be advantageously obtained by the action of the interfacial tension of the inorganic material subbing layer 52 and the molten metal layer 53.

EXAMPLES

The present invention will now be further illustrated by, but is by no means limited to, the following examples.

EXAMPLE 1

A poly(methyl methacrylate) substrate having a diameter of 300 mm and a thickness of 1.2 mm was placed, after washing, in a bell-jar. SiO in a boat located in the bell-jar was heated under a pressure of $10^{-6}$ Torr, while the substrate was turned at a speed of 120 rpm, to deposit a SiO layer having a thickness of 5 nm on the surface of the substrate.

Then, Te in a boat located in the bell-jar was heated under a pressure of $10^{-6}$ Torr, while the deposited substrate was turned at a speed of 120 rpm, to deposit a Te layer having a thickness of 5 nm on the surface of the SiO layer.

Thereafter, copper phthalocyanine in a boat located in the bell-jar was heated under a pressure of $10^{-6}$ Torr, while the deposited substrate was turned at a speed of 120 rpm, to deposit a copper phthalocyanine layer on the Te layer. Finally, a Te layer having a thickness of 20 nm was deposited on the copper phthalocyanine layer in the same manner as described above.

As a comparative example, a Te layer having a thickness of 20 nm was deposited on the surface of a poly(methyl methacrylate) substrate used above.

The recording and reading out tests were effected in the resultant recording media. The results are shown in Table 1 below.

TABLE 1

| No. | Speed of optical disc (rpm) | Power of laser beam (mW) | S/N ratio of reproduction signal (dB) |
| --- | --- | --- | --- |
| Example 1 | 600 | 4.5 | 40 |
|  | 1800 | 10.5 | 46 |
| Comparative Example | 600 | 7.5 | 34 |
|  | 1800 | 17–18 | 38 |

EXAMPLE 2

A recording medium, comprising, in the order listed below, a poly(methyl methacrylate) substrate having a thickness of 1.2 mm, a SiO layer having a thickness of 10 nm, a copper phthalocyanine layer having a thickness of 20 nm, and a Te layer having a thickness of 19 nm, was prepared in the same manner as in Example 1. The recording and reading out tests were carried out at an optical disc speed of 600 rpm. The results are shown in Table 2.

TABLE 2

| Speed of optical disc (rpm) | Power of laser beam (mW) | S/N ratio of reproduction signal (dB) |
| --- | --- | --- |
| 600 | 6 | 38 |

EXAMPLES 3 TO 5

Recording media were prepared in the same manner as described in Example 1, except that the metal layer and the organic substance layer were changed as listed in Table 3.

The recording and reading out tests were carried out in the same manner as in Example 1. The results are shown in Table 3.

TABLE 3

| Example No. | Metal layer (nm) | Sublimable organic substance layer (nm) | Power of laser beam (mW) | S/N ratio of reproduction signal (dB) |
| --- | --- | --- | --- | --- |
| 3 | Te (20) | Fluorescein (15) | 7.0 | 40 |
| 4 | Bi (20) | Fluorescein (15) | 10.0 | 33 |
| 5 | Bi (20) | Copper phthalocyanine (15) | 7.5 | 35 |

We claim:

1. A recording medium suitable for writing and reading out information by irradiating a photobeam onto a recording layer, said recording medium consisting essentially of:
   a radiation transmissible substrate;
   at least one radiation transmissible subbing layer comprised of at least one inorganic material laminated on said radiation transmissible substrate and having a thickness substantially in the range of 3 nm–100 nm; and
   a recording layer formed on said at least one radiation transmissible subbing layer, comprising:
   at least one first metal layer laminated on said at least one radiation transmissible subbing layer and having a thickness substantially in the range of 5 nm–100 nm;
   at least one sublimable organic substance layer laminated on said first metal layer and having a thickness substantially in the range of 5 nm–100 nm, said sublimable organic substance layer being at least one substance selected from the group consisting of copper phthalocyanine, fluorescein, and lead phthalocyanine; and
   at least one second metal layer laminated on said at least one sublimable organic substance layer and having a thickness substantially in the range of 5 nm–100 nm, said first and second metal layers having a melting point of 1000° C. or less and a thermal conductivity of 0.1 cal/sec.cm.deg. or less, the melting point of said first and second metal layers being lower than the melting point of said at least one inorganic material of said at least one radiation transmissible subbing layer, the sublimation point of said at least one sublimable organic substance layer being within a range of ±20% of the melting point of said first and second metal layers.

2. A recording medium as claimed in claim 1, wherein said radiation transmissible substrate comprises a synthetic resin.

3. A recording medium as claimed in claim 2, wherein the synthetic resin is selected from the group consisting of poly(methyl methacrylate), polycarbonate, poly(vinyl chloride) and polystyrene.

4. A recording medium as claimed in claim 1, wherein the inorganic material is selected from the group consisting of SiO, $SiO_2$, $MgF_2$, $Al_2O_3$ and any mixture thereof.

5. A recording medium as claimed in claim 1, wherein said first and second metal layers are selected from the group consisting of Te, Bi, In, Se, As, Pb, Sn, and any alloy therefrom and mixture thereof.

* * * * *

UNITED STATES PATENT AND TRADEMARK OFFICE
CERTIFICATE OF CORRECTION

PATENT NO. : 4,650,742
DATED : MARCH 17, 1987
INVENTOR(S) : YASUYUKI GOTO ET AL.

It is certified that error appears in the above-identified patent and that said Letters Patent is hereby corrected as shown below:

FRONT PAGE, [57] ABSTRACT, line 19, "layer the" should be --layer. The--.

Col. 4, line 7, "photobeam recording" should be --photobeam. Recording--.

Col. 5, line 61, under "phthalocyanine" insert --(15)--.

Signed and Sealed this

Twentieth Day of October, 1987

Attest:

DONALD J. QUIGG

*Attesting Officer*    *Commissioner of Patents and Trademarks*